United States Patent [19]
Folsom

[11] 3,848,569
[45] Nov. 19, 1974

[54] METHOD AND APPARATUS FOR CONTROLLING GASEOUS ENVIRONMENT

[75] Inventor: Max H. Folsom, Portland, Oreg.

[73] Assignee: National Appliance Company, Portland, Oreg.

[22] Filed: May 29, 1973

[21] Appl. No.: 364,720

Related U.S. Application Data

[63] Continuation-in-part of Ser. No. 293,014, Sept. 28, 1972, abandoned.

[52] U.S. Cl. ............................................. 119/37
[51] Int. Cl. ........................................... A01k 41/04
[58] Field of Search ............................... 119/35–44

[56] References Cited
UNITED STATES PATENTS
2,864,336  12/1958  Hamnett ............................. 119/40

*Primary Examiner*—Hugh R. Chamblee
*Attorney, Agent, or Firm*—Klarquist, Sparkman, Campbell, Leigh, Hall & Whinston

[57] ABSTRACT

A controlled environment enclosure such as an incubator for use in biological culture growth is provided with air circulation apparatus and a sensor for detecting the proportion of carbon dioxide within the enclosure. A control system is provided which initiates a supply of carbon dioxide to the enclosure until a selected level is reached.

31 Claims, 16 Drawing Figures

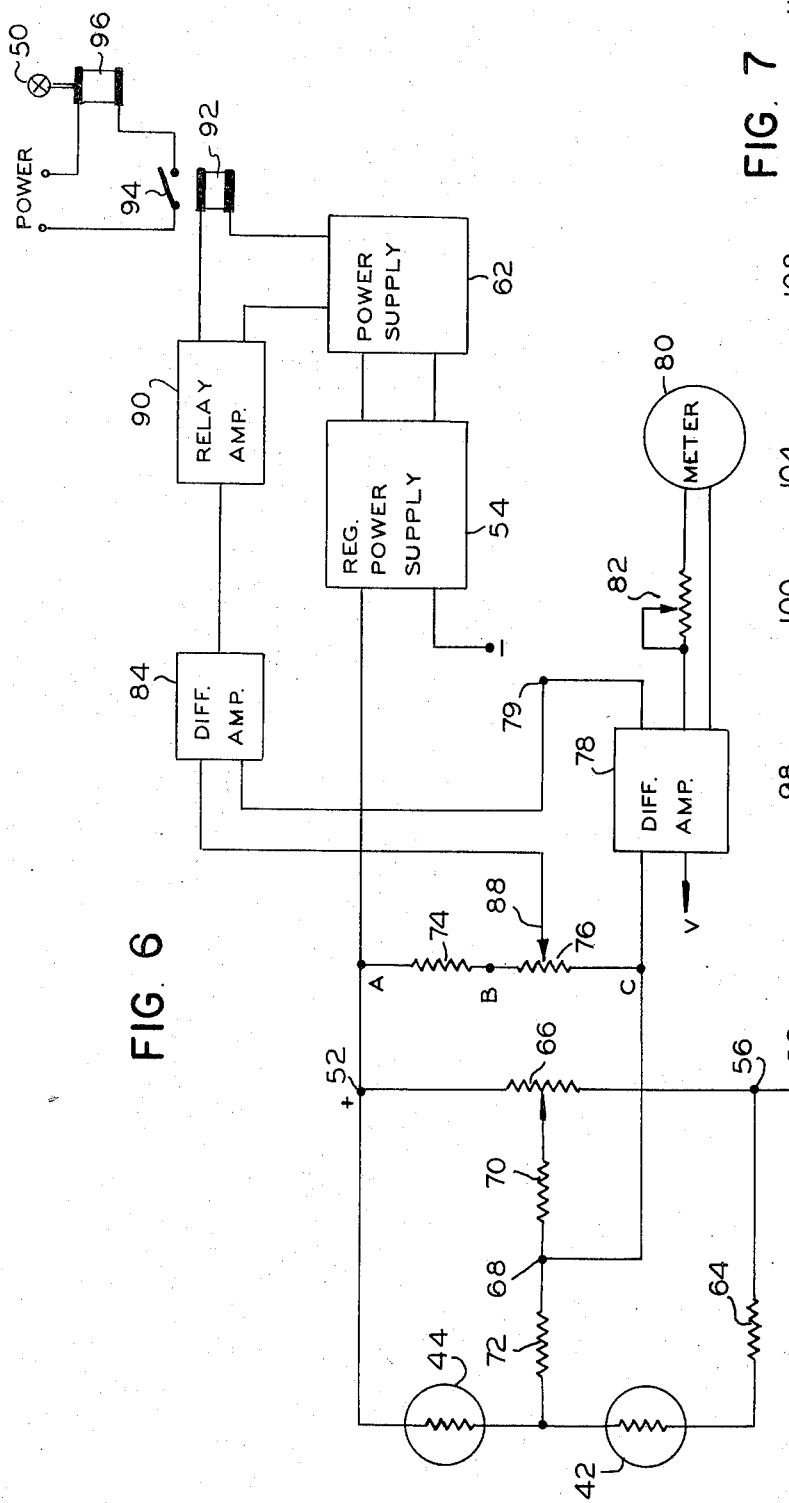
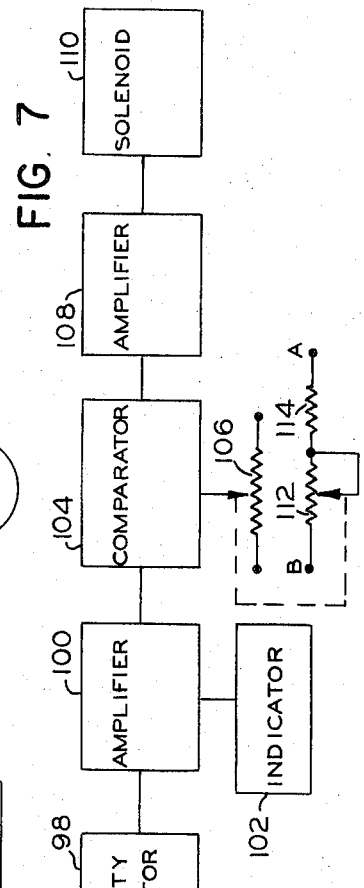
FIG. 6
FIG. 7

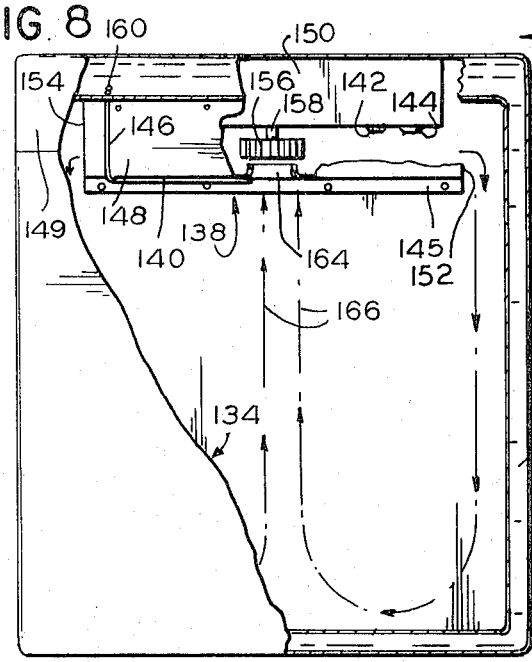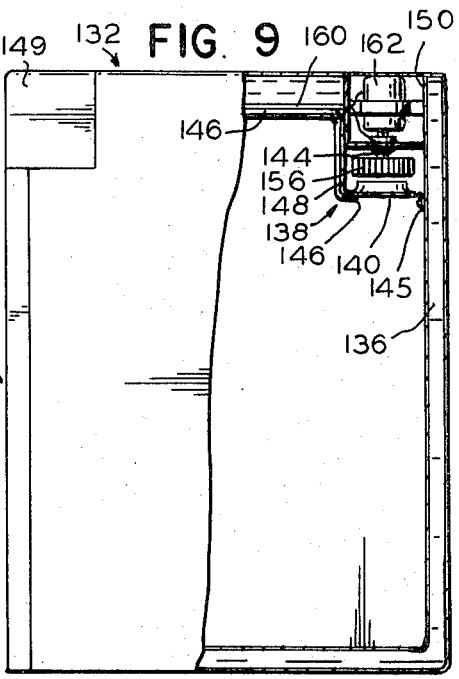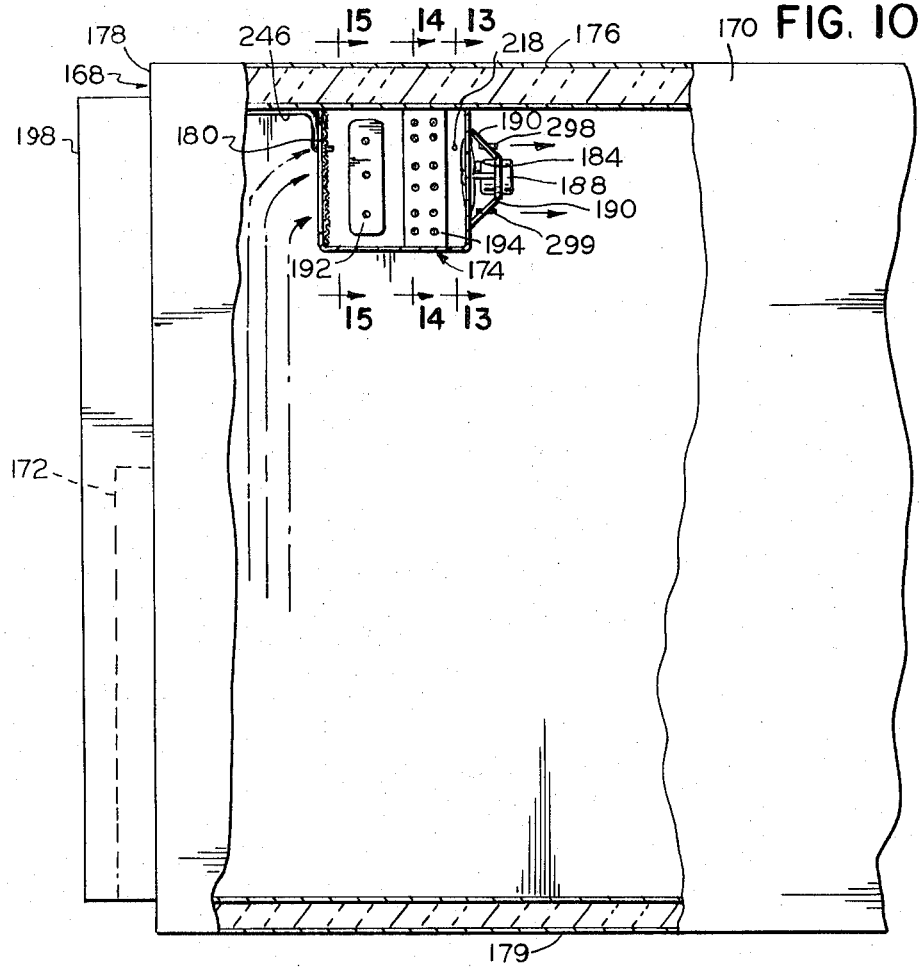

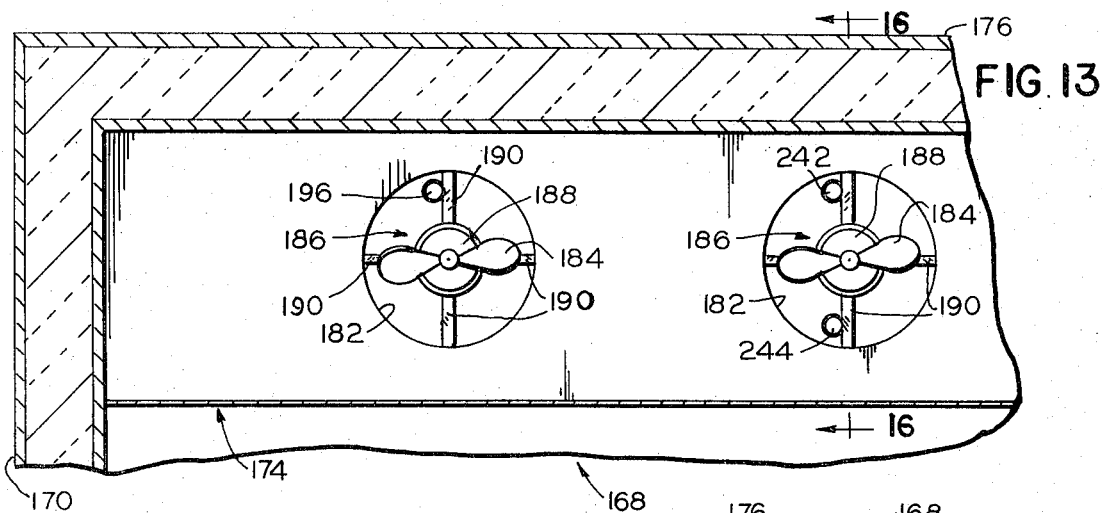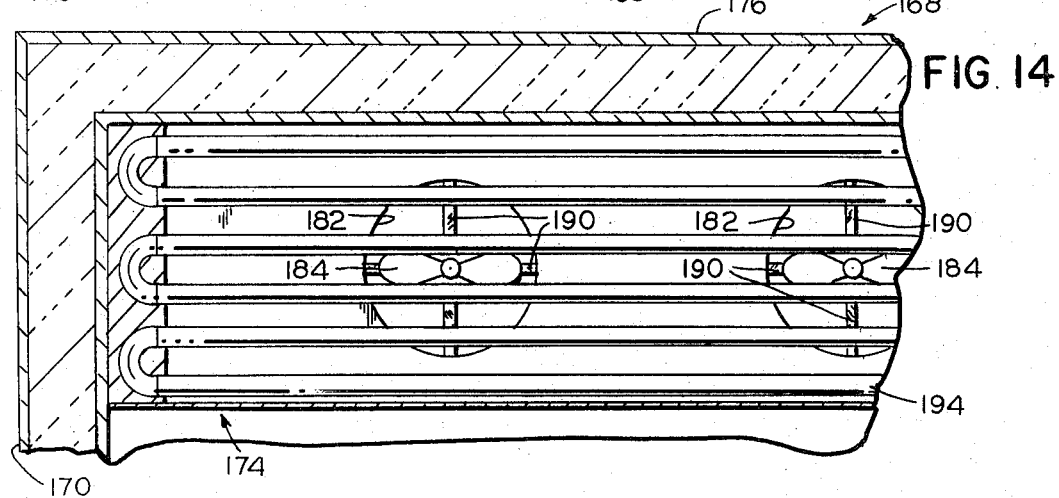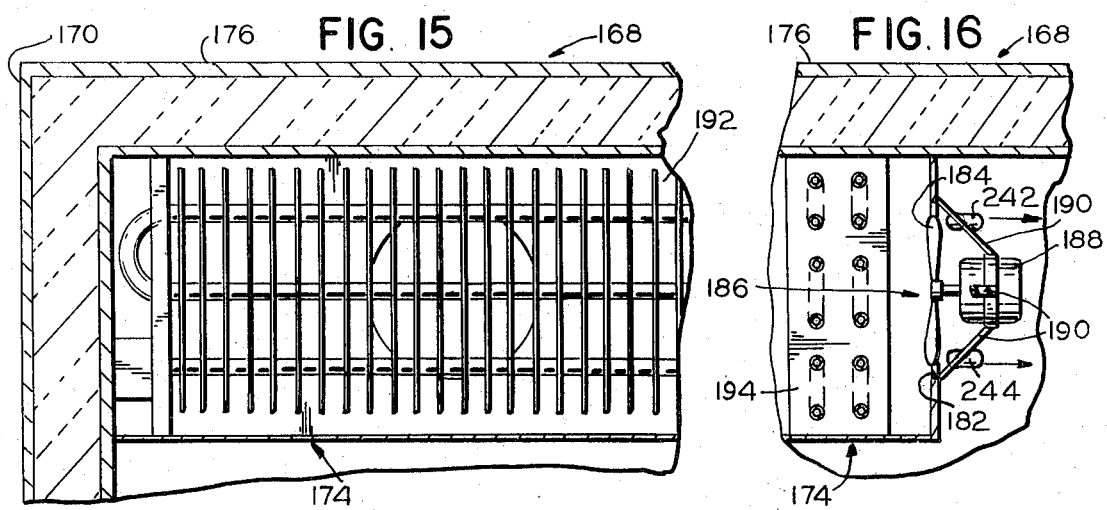

METHOD AND APPARATUS FOR CONTROLLING GASEOUS ENVIRONMENT

CROSS REFERENCE TO RELATED APPLICATION

This application is a continuation-in-part of my application Ser. No. 293,014 filed Sept. 28, 1972, entitled CARBON DIOXIDE CONTROL FOR INCUBATORS, now abandoned

BACKGROUND OF THE INVENTION

Incubators used in biological culture growth are advantageously provided with a gaseous environment simulating conditions within the human body. Thus, the interior of the incubator is regulated in temperature and is fairly moist, with a fairly high concentration of carbon dioxide being maintained. Conventional systems have been largely of the "flow-through" type, providing a continuously changing gaseous environment within the incubator and requiring fairly large quantities of carbon dioxide, continuously metered to provide the proper mixture. Thus, a carbon dioxide valve control is set to provide nearly the proper concentration of the carbon dioxide gas in a mixture of gas supplied to the incubator. Not only is such an arrangement expensive and wasteful of carbon dioxide, but also the concentration of carbon dioxide is not always easily controlled over a period of time.

Moreover, the control of gaseous environment in larger enclosures such as walk-in boxes or environmental rooms would also be desirable. However, the quantity of gas which must be supplied to a large enclosure in a flow-through type of system is such that the expense would tend to outweight the advantages attained.

SUMMARY OF THE INVENTION

According to the method and apparatus of the present invention, the proportion of carbon dioxide or other selected gas having a specific heat substantially different from that of air in an enclosure is sensed by electrically detecting a parameter which changes in accordance with the gas concentration. A gas flow is continuously effected past an electrical sensing means where such parameter is detected. A specified concentration of the selected gas is predetermined and the aforementioned parameter is compared with the desired concentration. The selected gas is automatically added to the enclosed environment when the concentration falls below the specified level.

In accordance with another aspect of the present invention, the humidity in the same enclosure is also detected and water added to bring the humidity to the desired level. Thus two major variables in the usual air environment, e.g., moisture and $CO_2$, may be controlled. Moreover, the moisture content suitably provides an additional input for a carbon dioxide control for removing discrepancies in carbon dioxide measurement and control at high moisture levels.

It is therefore an object of the present invention to provide an improved controlled environment enclosure wherein the concentration of a selected gas may be specified and accurately controlled without excessive consumption of such gas.

Another object of the present invention is to provide an improved controlled environment enclosure where the concentration of a selected gas can be accurately predetermined.

It is another object of the present invention to provide an improved incubator method and apparatus for use in biological culture growth having the advantages of improved carbon dioxide level control and decreased carbon dioxide consumption.

It is another object of the present invention to provide an improved method and apparatus for automatically controlling the concentration of carbon dioxide or similar gas in either a semi-closed or flow-through type of system.

It is another object of the present invention to provide an improved method and means for controlling humidity in an environmental system, and for coordinating moisture and gas levels in such system.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 6 is an electrical control diagram, according to the present invention, for maintaining carbon dioxide concentration;

FIG. 7 is a block diagram illustrating a cooperating humidity control according to the present invention;

FIG. 8 is a front view of the apparatus according to another embodiment of the present invention including an incubator having plenum chamber means mounted therewithin;

FIG. 9 is a side view of the apparatus from 9—9 in FIG. 8;

FIG. 10 is a partially broken away side view of apparatus according to a further embodiment of the present invention comprising an environmental room having plenum chamber means mounted from the top wall thereof for the control of gas therewithin;

FIG. 13 is a cross-sectional view taken at 13—13 in FIG. 10, such view being partially broken away;

FIG. 14 is a cross-sectional view, partially broken away, taken at 14—14 in FIG. 10;

FIG. 15 is a further cross-sectional view, partially broken away, taken at 15—15 in FIG. 10; and FIG. 16 is a cross-sectional view, partially broken away, taken at 16—16 in FIG. 13.

DETAILED DESCRIPTION

Figure 1:
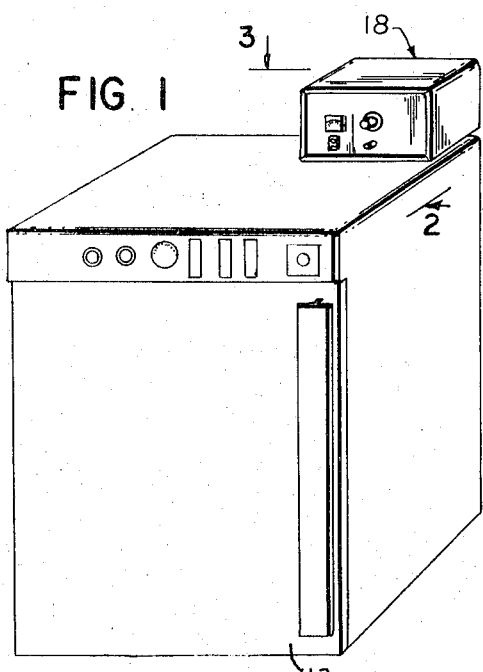
FIG. 1 is a perspective view of apparatus according to the present invention including an incubator having plenum chamber means mounted thereupon for the control of carbon dioxide therewithin.

Referring to the drawings and particularly to FIGS. 1 to 4, an incubator 10 for use in biological culture growth comprises a closed cabinet having a front door 12 and shelves 14 therewithin for supporting bacteria cultures in a medium such as agar. The cabinet is provided on five sides, i.e., other than the side upon which door 12 is mounted, with a water jacket 16, and is maintained therewithin at a substantially constant temperature by thermostat means (not shown). The interior of the cabinet may also be provided in some cases with an open container which holds water, the inside of the cabinet simulating conditions in the human body with respect to temperature, moisture, and carbon dioxide concentration.

In accordance with a first embodiment of the present invention, a plenum chamber means 18 is disposed at the top of incubator 10, communicating therewith by means of a cylindrical tube providing an aperture 20 extending through the top of the cabinet and through the water jacket 16, a gasket 22 being disposed between the incubator 10 and the plenum chamber means 18 for making a sealing connection with a matching aperture in the latter.

Plenum chamber means 18 includes the plenum chamber 24 communicating at one end thereof with fan housing 26 enclosing impeller 28 driven by motor 30. The fan arrangement withdraws air from the plenum chamber 24 and directs the same via a duct 32, passing through aperture 20 in coaxially spaced relation, to a further communicating duct 34 disposed along the back wall of incubator 10. The lower extremity of substantially rectangular duct 34 is open near the lower wall of incubator 10 whereby the direction of airflow is downward through duct 34 to the lower levels of the incubator. The duct 34 suitably extends to within four inches of bottom of the inside of incubator 10.

The air is drawn into plenum chamber means 18 through space 33 around duct 32 into a side chamber 36 communicating with plenum chamber 24 through aperture 38. The plenum chamber is provided with a flanged connection 40 supplied with a gasket having a sealing relation around aperture 38 in the side wall of side chamber 36.

The plenum chamber 24 is further supplied with sensing means 42 and reference means 44 located in a removable top wall thereof for ascertaining the proportion of carbon dioxide in the stream of gas passing through the plenum chamber. Each of these two members, 42 and 44, comprise a coil of platinum wire disposed in a holder, with the platinum wire element of sensing means 42 being exposed to the gaseous environment of the plenum chamber through a mesh-covered opening in its holder. The reference means 44 is substantially similar except the holder therefor is closed. As will be hereinafter more fully described, both members 42 and 44 are maintained at substantially the same external temperature since they are mounted in proximity to one another inside the top wall of the plenum chamber, but only the sensing means 42 will react to the differential presence of carbon dioxide. The plenum chamber 24 is normally closed except for the connection 40 as well as the end opening communicating with the fan housing 26, and except for a carbon dioxide inlet tube 46 disposed in the sidewall thereof. Inlet tube 46 is joined to carbon dioxide supply tube 48 by means of solenoid valve 50, whereby when valve 50 operates, carbon dioxide is delivered from a canister of such gas (not shown) via tube 48. The delivery of carbon dioxide is controlled from sensing means 42 as hereinafter more fully described in such a manner as to maintain the carbon dioxide content of the gaseous environment within the incubator at a desired level.

The fan assembly thus circulates air from the incubator up through passage 33 from the top of the incubator and into plenum chamber 24 where the carbon dioxide content is measured and additional carbon dioxide is added, if need be, to bring the carbon dioxide level up to a selected value. The gas is withdrawn from plenum chamber 24 by the fan and returned to the bottom of the incubator by way of duct 34. The system is thus recirculating and employs substantially less carbon dioxide than heretofore employed in conventional flow-through systems. However, a small aperture (not shown) is suitably provided at the rear of the incubator for the purpose of preventing undesired pressure buildup therewithin, and small amounts of carbon dioxide will normally be added from time to time. The systems according to the present invention can alternatively be employed, if desired, in combination with a conventional flow-through apparatus for selecting carbon dioxide concentration therein, rather than in a substantially closed apparatus. Thus the concentration of carbon dioxide is still sensed and the flow of carbon dioxide to the system is adjusted automatically.

Referring now to FIG. 6, comprising a schematic diagram of control circuitry according to the present invention, the sensing means 42 and the reference means 44 are disposed in what may be described as a bridge circuit extending between the terminal 52 of regulated power supply 54 and a terminal 56 coupled to negative or ground terminal 58 via resistor 60. Regulated power supply 54, receiving its power input from conventional power supply 62, is suitably a constant current supply. A first arm of the bridge comprises reference means 44 while a second arm of the bridge comprises sensing means 42 in series with resistor 64. Elements 44, 42, and 60 are thus disposed in series between terminals 52 and 56. Third and fourth arms of the bridge are formed by potentiometer 66, employed for initial balancing purposes, having its end terminals connected to terminals 52 and 56, respectively, and having its movable tap connected to center point 68 by way of resistor 70. Also, a resistor 72 is disposed between center point 68 and the junction between elements 42 and 44. A further cooperating circuit comprises the series connection of resistor 74 and potentiometer 76 disposed in that order between terminal 52 and center point 68. The respective connective points of the voltage divider thus formed are labeled A, B and C for convenience of identification.

Figure 3:
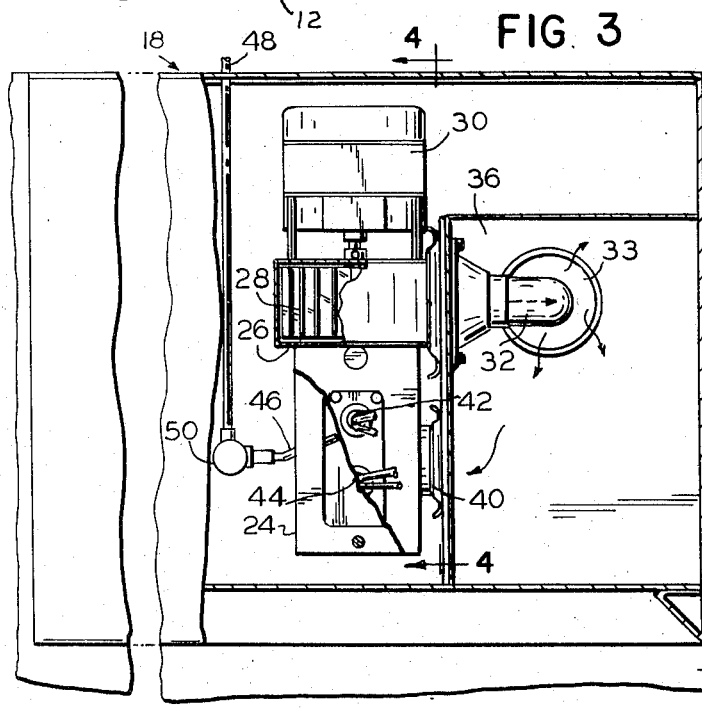
FIG. 3 is a transverse cross-sectional view of a portion of said plenum chamber means taken at 3—3 in FIG. 1.

Center point 68 is connected as an input to a first differential amplifier 78 having its remaining differential input connected to a predetermined voltage level, V. An output of differential amplifier 78 is coupled to a meter 80, calibrated to read the percentage of carbon dioxide present, by way of an adjustable resistance 82. Another output of differential amplifier 78 at terminal 79 is supplied as an input to a second differential amplifier 84 receiving its additional differential input from movable tap 88 of potentiometer 76. Differential amplifier 84 provides the input to relay-driving amplifier 90, the output of which is connected to supply power from power supply 60 to relay 92 having contacts 94 disposed in series between solenoid 96 and a source of power. It will be noted that solenoid 96 functions to operate valve 50 for supplying carbon dioxide via tube 46 to plenum chamber 24 as depicted in FIG. 3.

Considering operation of the FIG. 6 circuit, it can be seen that sensing means 42 and reference means 44 are disposed in a balanced arrangement with respect to center point 68. A change in ambient temperature in the plenum chamber will affect both elements 42 and 44 similarly, but will not affect the voltage level at point 68. However, if sensing means 42 changes in resistance due to the presence of a greater or lesser concentration of carbon dioxide, then an output will be produced at point 68 for changing the operation of differential amplifier 78.

The elements 44 and 42 are heated by the current passing therethrough, but, of course, the temperatures of elements 42 and 44 are also affected by their surrounding environment. The specific heat of carbon dioxide is appreciably less than the other gaseous constituents of air, normally comprising the environment within incubator 10, and therefore the sensing means 42 is responsive to the concentration of carbon dioxide. A greater concentration of carbon dioxide will cause a slight increase in the temperature of element 42, resulting in an increase in the resistance thereof and the voltage drop thereacross, while a decrease in the proportion of carbon dioxide will bring about a slight reduction in the temperature of element 42, resulting in a decrease in the resistance thereof and the voltage drop thereacross. Thus, the voltage terminal 68 will rise for an increase in carbon dioxide content in the airstream, while the voltage at point 68 will lower with a decrease in carbon dioxide in the airstream and these voltage changes are in substantial proportion to the change in carbon dioxide content.

Let us assume the circuit is initially balanced for substantially zero concentration of carbon dioxide. Movable tap 88 of potentiometer 76 is positioned at the lower extremity, i.e., toward point "C" representing substantially zero percentage carbon dioxide, and the movable tap of potentiometer 66 is balanced for a substantially zero or ambient reading on meter 80. It will also be assumed that an environment containing a relatively small concentration of carbon dioxide affects sensing means 42, i.e., nothing but air in the plenum chamber. The normal carbon dioxide content of air is on the order of 3/100 of one percent by volume, while the desired percentage to be later achieved in the incubator environment is on the order of 4 to 10 percent.

At bridge balance with substantially zero carbon dioxide present and the settings as indicated above, the tap 68 voltage equals the tap 88 voltage which equals the terminal 79 voltage, the two differential inputs of amplifier 84 being equal. Let us assume relay amplifier 90 may just be operated for actuating relay 92 and solenoid 96 for providing carbon dioxide to the system. The differential amplifier 84 provides an output so long as the voltage at potentiometer tap 88 is substantially equal to or greater than the voltage at terminal 79. However, the slightest additional carbon dioxide detected by sensing means 42 will unbalance the circuit, causing the voltage at point 68 to rise with increased voltage drop across element 42. The increased input to differential amplifier 78 will cause an increase in amplifier output at terminal 79, thereby shutting off differential amplifier 84 since the voltage at point 79 will be greater than the voltage at tap 88. Therefore relay amplifier 90 causes deactuation of relay 92. Of course, the voltage at tap 88 rises at this time, but to a lesser extent since the voltage at differential amplifier output terminal 79 is an amplified version of the input voltage provided thereto. In effect, for the settings assumed, the circuit will maintain the carbon dioxide concentration at a low level read by meter 80.

Then, for a higher percentage of carbon dioxide in the environment, the movable tap 88 of potentiometer 76 is adjusted above point C relative to a dial scale. Again, the voltage at point 79 must exceed the voltage at point 88 for the relay 92 to shut off, concluding delivery of carbon dioxide. It will be seen that the system stabilizes at a new percentage, with relay 92 being deenergized when the desired level is reached. If the carbon dioxide level falls below the desired setting, the relay is reenergized resulting in the introduction of more $CO_2$. Potentiometer 76 has an arbitrary scale. Meter 80 is calibrated to read carbon dioxide percentages on the order of zero to 25 percent, and is used in conjunction with potentiometer adjustment to establish the "set" point. In the present circuit, differential amplifier 84 comprises comparison means for comparing the resistance or voltage drop parameter of element 42 with the desired carbon dioxide concentration as selected by potentiometer 76.

Figure 2:
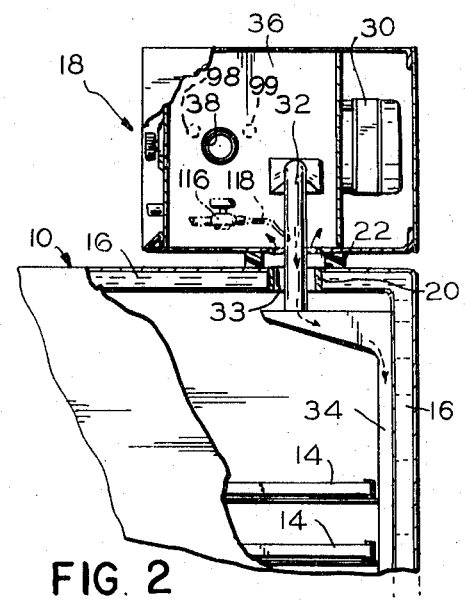
FIG. 2 is a partially broken away side view of said incubator and plenum chamber means.

Additional circuitry which may be employed in conjunction with the present invention is illustrated in FIG. 7 and comprises a humidity detector 98 providing an input to an amplifier 100 which drives a relative humidity indicator 102. The amplifier 100 also provides an output to comparator 104 which compares the amplified humidity parameter with a value of humidity selected by means of potentiometer 106. Until the desired comparison is reached, comparator 104 supplies an output to amplifier 108 driving solenoid 110 which controls a source of water connected to the incubator environment. As illustrated in FIG. 2, valve 116 operated by solenoid 110 may provide water to tube 118 from a source of water (not shown). The tip of tube 118 is disposed in duct 32 where the flow of gas may aspirate a desired quantity of water into the system until humidity detector 98 provides an indication that the desired humidity has been reached. Humidity detector 98 suitably comprises a humidity sensor formed of hygroscopic material capable of changing its electrical resistance in accordance with the humidity detected. Such detection elements are well known and may be obtained, for example, from the Minneapolis Honeywell Company. The humidity detector 98 may be located, for example, as indicated in FIG. 2, i.e., within side chamber 36 adjacent a standard or reference element 99.

The humidity control circuit, as illustrated in block diagram form in FIG. 7, may be substantially similar to the circuit illustrated in FIG. 6 employed for the carbon dioxide control. That is, the humidity detector and standard reference elements are suitably disposed in a bridge type circuit in the same manner as elements 42 and 44 in FIG. 6, and coupled to amplifier 100 in FIG. 7 in substantially the same way as the bridge circuitry in FIG. 6 is coupled to amplifier 78. Indicator 102 corresponds to meter 80, comparator 104 corresponds to amplifier 84, and amplifier 108 may be substantially identical to amplifier 90 in FIG. 8.

The potentiometer 106 in the FIG. 7 circuit is connected in the same manner as the potentiometer 76 in FIG. 6, and is further ganged with a variable resistor 112 connected in series with a resistor 114, this combination suitably being coupled across terminals "A" and "B" in the FIG. 6 circuit for acting as a vernier or calibration relative to the carbon dioxide control. At relatively high humidity settings, e.g., in the range above 90 percent, it is found the humidity has an effect upon the accuracy of carbon dioxide readings and control. For this reason, the potentiometer 112 is suitably interposed and constructed to change its resistance for high humidity settings of control potentiometer 106. The resistance and taper of control 112 as well as the value for resistor 114 are empirically determined to supply the proper compensation for maintaining the carbon dioxide reading and control accurate at high humidity levels. This assumes, of course, that the FIG. 7 apparatus is active for actually controlling the humidity of the system in response to the setting of potentiometer 106. Alternatively, the output of amplifier 100 coupled to indicator 102 can also be employed above a threshold level as an additional input to differential amplifier 78 in FIG. 6, and/or as an additional input to amplifier 84 for maintaining carbon dioxide control and/or indication accurate. While the humidity control circuitry of FIG. 7 is a desirable addition to the system, for some purposes the humidity may be maintained within the incubator by other means, for example by merely locating a container of water on one of the shelves 14 as hereinbefore mentioned. Such container is normally not utilized if the automatic humidity control is employed.

The fan apparatus 26, 28 in FIG. 3 is employed not only for moving gas through the plenum chamber 24 where the content thereof may be measured and where additional carbon dioxide may be added, but also for providing circulation of the gaseous environment within the incubator to prevent layering of the gases therewithin at different levels. The same circulation effect can be suitably accomplished by the alternative construction illustrated in FIG. 5. In such alternative construction, a fan impeller 119 supported on shaft 120 extending through water jacket 122 is located at a sidewall or top wall of the incubator itself for causing circulation of gases within the incubator. The shaft 120 extends through bearing means 124 sealed from the water jacket, and further extends to the outer wall 126 of the incubator 132 where a motor 130 is mounted in driving relation to the shaft. The shaft and bearing arrangement may, for example, be disposed in an aperture such as aperture 20 in FIG. 2 in place of the connections to the plenum chamber means. The plenum chamber of FIGS. 1 through 4 would then not be used.

Figure 5:
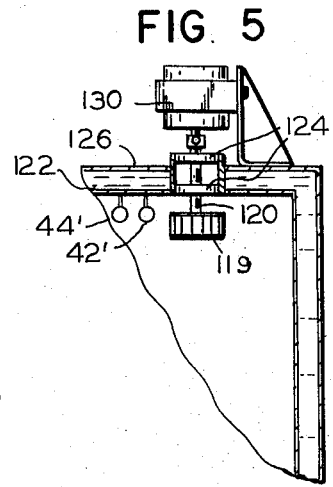
FIG. 5 is a partial view, illustrating an alternative construction according to the present invention.

Sensing element 42' and reference element 44' in FIG. 5 are similar to similarly numbered elements 42 and 44 in FIG. 6, and are mounted on the inside wall of the incubator in proximity to the fan impeller 119 so as to be affected by a representative stream of gas within the incubator environment. The system otherwise suitably employs the circuitry of FIG. 6 and may also employ the humidity control of FIG. 7, for operation in substantially the same manner as hereinbefore disclosed. In such event, carbon dioxide may be coupled into the interior of the incubator at a convenient location, as well as water in the case of a humidity control system.

Referring to FIGS. 8 and 9 illustrating a further embodiment according to the present invention, an incubator 132 comprises a closed cabinet having a front door 134. The cabinet is provided on the five remaining sides with a water jacket 136, and is maintained therewithin at a substantially constant temperature by thermostat means (not shown). As in embodiment of FIGS. 1 through 4, the cabinet interior may be provided in some cases with an open container which holds water, and may also include shelves. The shelves should be at least partially spaced from the interior walls of the cabinet so as to avoid blocking circulation of air therewithin as hereinafter described.

A plenum chamber 138 is disposed within the cabinet at the top rear thereof and includes a horizontal wall 140 attached by means of vertical flange 145 to the rear of the cabinet, as well as a connected vertical wall 148 joined to the front wall of a motor compartment 150. The plenum chamber is open at its ends defining outlet ports 152 and 154, spaced from the side walls of the cabinet, through which air exits from the plenum chamber. A fan impeller 156 is supported on motor shaft 158 extending vertically from driving motor 162 located in the motor compartment, the impeller being positioned by the shaft substantially at the center of plenum chamber 138.

The lower wall 140 of plenum chamber 138 is provided with a central aperture having a curved circular lip extending upwardly to define a circular duct 164 leading to the inside of impeller 156, and disposed in coaxial relation therewith, so that rotation of impeller 156 by motor 162 draws air vertically into the plenum chamber as indicated at 166. The air then travels outwardly in both directions along the plenum chamber 138 for exit at ports 152 and 154. As a result, air is circulated down along the sides of the cabinet interior and centrally upwardly into duct 164. As hereinbefore indicated, shelves as may be disposed within the cabinet are desirably spaced from the rear wall of the cabinet, and from at least part of the side walls, in order to facilitate the desired circulation.

The plenum chamber 138 is supplied with sensing means 142 and reference means 144, mounted on the lower wall of the motor compartment and within the plenum chamber, these means being positioned adjacent one another in the air flow path produced by impeller 156. The electrical leads for the sensing and reference means communicate to a control panel 149, via conduit 160 passing through the water jacket at the top of the cabinet. Also, carbon dioxide is coupled into the plenum chamber by way of carbon dioxide inlet tube 146 extending through the water jacket from the control panel. The open or nozzle end of the inlet tube, through which carbon dioxide is delivered to the plenum chamber, is located proximate duct 164 where the $CO_2$ may be drawn into the circulation stream by impeller 156. That is, the open end of the inlet tube is located adjacent duct 164 on the underside of wall 140. Alternatively, it may be located within the plenum chamber.

The sensing means 142 and reference means 144 may respectively be substantially the same as the sensing means 42 and reference means 44 in the first embodiment. Each of the members 142 and 144 includes a coil of platinum wire disposed in a stainless steel jacket or holder, with the platinum wire element of the sensing means 142 being exposed to the gaseous environment of the plenum chamber through a mesh-covered opening in its holder. The reference means 144 is substantially similar except the holder therefor is closed. Both members 142 and 144 are subject to the same external temperature since they are mounted in proximity to one another in the plenum chamber, but only the sensing means 142 will react to the differential presence of carbon dioxide gas as hereinbefore more fully described.

Furthermore, the apparatus suitably employs the circuitry of FIG. 6 and may also employ the humidity control of FIG. 7 for operation in substantially the same manner as hereinbefore disclosed. For the purpose of humidity control, sensing and reference means as well as water inlet tube may be disposed in the left-hand arm of plenum chamber 138 between impeller 156 and port 154, such sensing and reference means corresponding respectively to elements 98 and 99 in the first embodiment and the water inlet tube corresponding to tube 118.

Carbon dioxide inlet tube 146 may be connected to a carbon dioxide supply by means of a solenoid valve corresponding to valve 50 in FIG. 6, whereby when such valve operates, carbon dioxide is delivered from a canister of such gas (not shown) to the inlet tube 146. The delivery of carbon dioxide is controlled in response to operation of the sensing means 142, in a manner substantially as hereinbefore described in connection with the FIG. 6 circuit, for maintaining the carbon dioxide content within the cabinet at a desired level.

Figure 4:
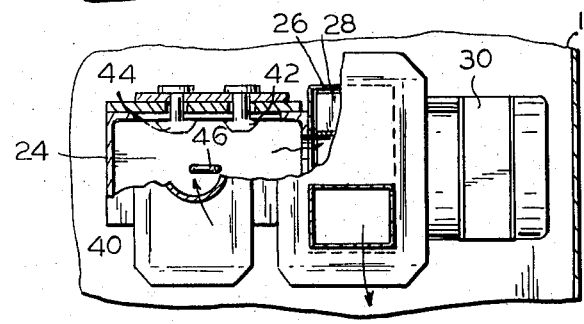
FIG. 4 is a vertical cross section taken at 4—4 in FIG. 3 and partially broken away.
Figure 11:
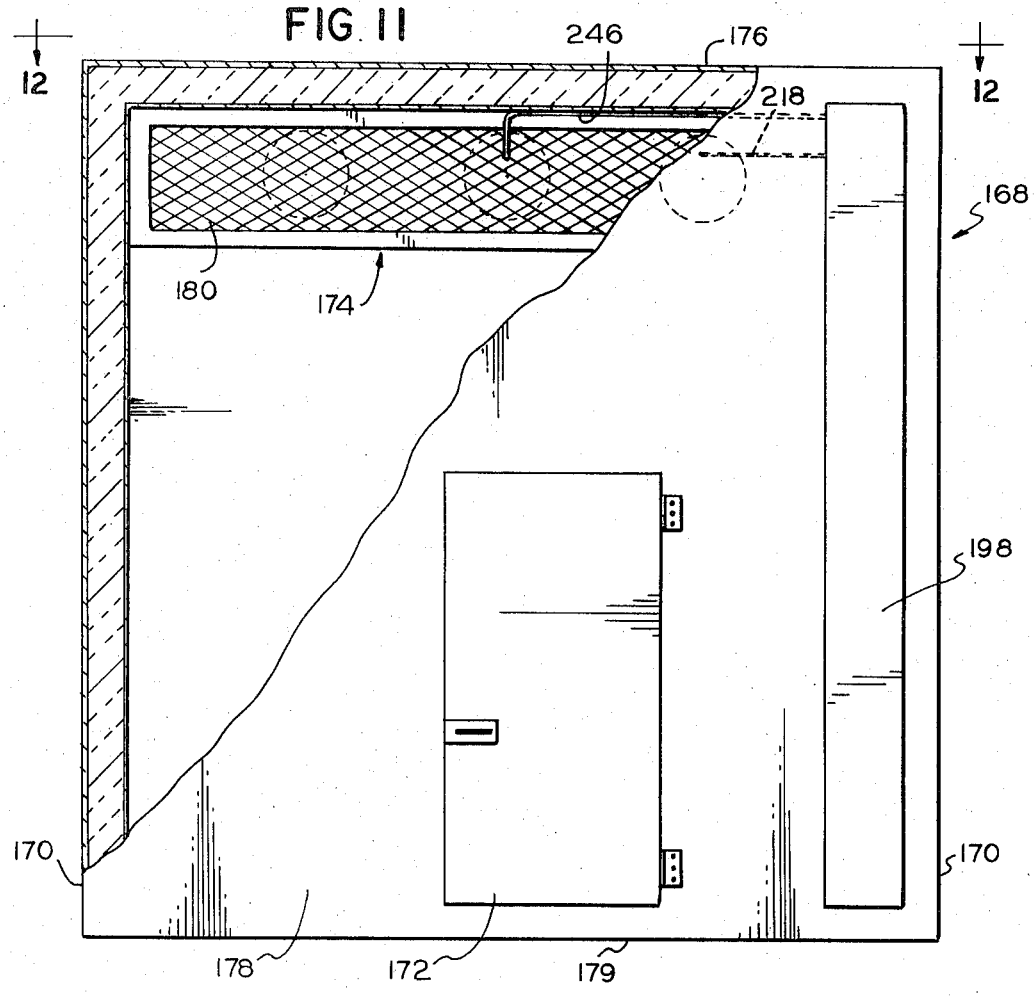
FIG. 11 is a front view of the FIG. 10 environmental room.
Figure 12:
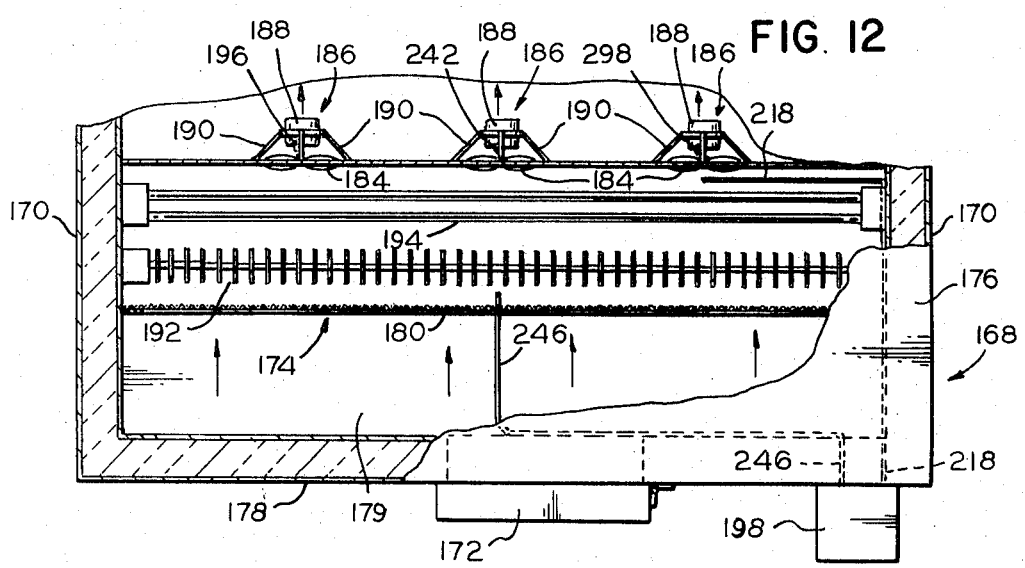
FIG. 12 is a top view, partially broken away, of said environmental room.

The embodiment of FIGS. 1 through 4, and the embodiment of FIGS. 8 and 9 employing plenum chambers are preferred to the arrangement of FIG. 5. Thus, when the carbon dioxide is delivered and detected in the plenum chamber which includes air circulation means, better mixing of the carbon dioxide with air and better distribution of the carbon dioxide within the cabinet is possible, Moreover, better sampling of the gaseous environment within the cabinet for control purposes is achieved. Furthermore, with the carbon dioxide inlet means being located for directing carbon dioxide gas toward the sensing element 42 or 142 as illustrated in FIGS. 4 and 7, more accurate control of the carbon dioxide level is secured. If carbon dioxide is introduced elsewhere in the cabinet, a large overshoot of carbon dioxide content can take place before the actual level of carbon dioxide content is detected and corrected. On the other hand, when the carbon dioxide is introduced before the sensing element, the overshoot condition is avioded. Carbon dioxide is introduced in short "spurts", each one causing the sensing element 42 or 142 to react and bring about the temporary turn-off of the carbon dioxide supply, followed by another spurt, until the proper ambient carbon dioxide level is reached. As a result, relatively gradual change and better control of carbon dioxide level is brought about without excessive overshoot. Accuracy of control is enhanced and waste of gas is avoided. Of course, when the system arrives at the desired carbon dioxide level, the supply of carbon dioxide will be discontinued by the control circuit of FIG. 6 until a loss of gas occurs, as when the cabinet door is opened, or as a result of gradual escape of gas through a small aperture or the like as hereinbefore mentioned.

A further advantage of location of sensing means in a stream of air, as produced, for example, by the impeller 156 in FIG. 8, relates to the avoidance of undesired condensation. It will be recalled the sensing means generally includes a mesh-covered opening through which a coil of platinum wire senses the change in the specific heat of the gas. The mesh may clog with condensation in the moist atmosphere. Consequently, it is of advantage for the airstream to flow directly past the sensing means, for causing evaporation of moisture which may have condensed on the mesh and which might hinder proper control.

The plenum chamber employed in the embodiment of FIGS. 8 and 9 is simpler than the plenum chamber of the embodiments of FIGS. 1 through 4, and is preferred for mew installations. The construction illustrated in FIGS. 1 through 4 is well suited to conversion of existing incubators to carbon dioxide control.

FIGS. 10 through 16 illustrate an environmental room or walk-in box which comprises a room-sized chamber having a controlled environment. The room 168 is provided with insulation filled side walls 170, front wall 178, top wall 176, floor 179, and rear wall (not shown). Front wall 178 includes a door 172 through which a person may gain entrance to the interior of the room. Walk-in rooms of this type are commonly employed for many purposes where samples or products are to be stored under controlled temperature and humidity conditions, and storage racks or shelving (not shown) may be employed inside the chamber for such purposes. However, chambers of room size or larger have generally not been adapted to control of gaseous environment, e.g., flow-through introduction of carbon dioxide or the like for an extended period of time, because of the expense involved in the considerable continued consumption of gas. Thus, it is not uncommon to provide a smaller incubator or the like within the larger room for supplying a controlled carbon dioxide environment of limited size.

According to the present invention, the gaseous environment within the chamber is continuously controlled without requiring a constant consumption of gas, thereby extending the volume or size of the chamber wherein a desired gaseous environment can be effected. In accordance with the present embodiment of the invention, room 168 is provided with an elongated plenum chamber 174 suspended from top wall 176 in spaced relation to front wall 178. The plenum chamber comprises an elongated rectangular box, the long dimension of which is parallel to front wall 178, said plenum chamber having a screen or grill 180 in the forward wall thereof, i.e., in spaced facing relation to the front wall 178 of the room. The plenum chamber is otherwise closed except for a plurality of evenly spaced openings 182 in the opposite or rear wall thereof for receiving the blades 184 of circular exhaust fans 186. In the illustrated embodiment, three such exhaust fans are positioned over corresponding openings in the rear wall of the plenum chamber 174. Each exhaust fan includes a motor 188 for rotating blades 184 each motor being supported on a spider 190 extending from the rear wall of the plenum chamber around the corresponding opening 182.

Immediately behind the front grill 180, the plenum chamber supports and houses a heating element 192 and a set of cooling coils 194 located between the heating element and the exhaust fans 186. The heating element suitably comprises a rod-enclosed electrical resistance element, provided with radiating fins, and connected to a source of electric power by means not shown. Similarly, the cooling coils 194 are provided refrigerant by conventional refrigerating equipment, not shown. The heating and cooling elements are suitably controlled from a thermostat 196 insulatedly supported on the spider 190 of the left-hand exhaust fan.

A gas sensing means 242 and a reference means 244 are suitably insulatedly mounted on the spider 190 of the center exhaust fan 186, in direct line from the stream of air directed rearwardly by the exhaust fan. A carbon dioxide inlet tube 246 extends into the plenum chamber and the open end thereof is directed toward the blade 184 of the center exhaust fan, whereby carbon dioxide introduced therethrough is not only circulated throughout the environmental room by the fan, but also more particularly the gas is directed toward sensing means 242. Thus, introduction of carbon dioxide will soon affect the sensing means 242 for preventing overshoot of the carbon dioxide level within the environmental room. The sensing means 242, reference means 244, and carbon dioxide inlet tube 246 are respectively substantially the same as sensing means 42, 142, reference means 44, 144, and carbon dioxide inlet tubes 46, 146 as hereinbefore described and have corresponding functions. Furthermore, the apparatus suitably employs the circuitry of FIG. 6 and may also employ the humidity control of FIG. 7 for operation in substantially the same manner as hereinbefore disclosed.

With regard to humidity control, the apparatus suitably includes a humidity detector 298 and a standard or reference element 299 insulatably mounted on the spider 190 of the right-hand fan 186. Water inlet tube 218 is positioned in front of the right-hand fan, whereby water supplied therethrough may be aspirated from the end of the tube by the airstream. Elements 298, 299 and 218 correspond to similarly numbered elements 98, 99 and 118 hereinbefore described.

The environmental room is suitably provided with an enclosed control panel 198 mounted on the exterior of front wall 178 for housing the control equipment as illustrated in FIGS. 6 and 7, as well as a supply of carbon dioxide and water. The same control panel may be employed for the temperature control circuits operating heating and cooling elements 192 and 194.

The plenum chamber 174 mounted above the door of the environmental room 168 provides good circulation of air within the room, drawing the air upward along the inside of forward wall 178 and expelling the airstream rearwardly within the room. Excellent mixing of the carbon dioxide may be produced as well as excellent distribution of carbon dioxide within the room. It will be appreciated that system control is temporarily lost when the door 172 is opened, but the device then recovers, reinjecting carbon dioxide to bring the concentration to the desired level again when the door is closed.

Although a specific shape of environmental chamber or room is shown for ease of illustration, it will be appreciated the same system may be employed in enclosures of varying sizes and shapes, such as display cases, storage warehouses for perishable items, storage freezers, and wherever a controlled gaseous environment is desired. Although control of carbon dioxide has been particularly described herein and is of particualr utility for many purposes, it will be appreciated that the level of other gases, similarly injected, can be controlled where the specific heat of the gas differs substantially from that of air or the major gaseous environment into which it is injected.

While I have shown and described plural embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A method of controlling the environment of an incubator by controlling the concentration of carbon dioxide therein, said method comprising:
    detecting the proportion of carbon dioxide in said incubator by electrically detecting a parameter which changes in accordance with the concentration of carbon dioxide,
    selecting the desired concentration of carbon dioxide and continuously comparing said parameter with a function of said desired concentration,
    and automatically adding carbon dioxide to the environment of said incubator whenever the concentration falls below the desired value.

2. The method according to claim 1 wherein said parameter comprises the specific heat of the gas in said incubator, said detecting including passing a current through a conductor exposed to gas of said environment and electrically ascertaining the voltage drop produced therein for use in comparison with said desired concentration.

3. The method according to claim 1 wherein said method further includes controlling the humidity of said environment, and calibrating said comparison of desired carbon dioxide concentration according to said controlled humidity.

4. The method according to claim 1 including circulating gas in said environment for producing movement thereof proximate the location of detection of the proportion of carbon dioxide.

5. Apparatus for controlling the concentration of carbon dioxide in a system providing a gaseous environment including carbon dioxide wherein a source of carbon dioxide is provided therefor, said apparatus comprising:
    means disposed in relation to said gaseous environment for providing a circulation therein preventing gaseous layering,
    sensing means located proximate the circulation stream produced by the last mentioned means and responsive to the circulation stream for producing a parameter which changes in accordance with the actual concentration of carbon dioxide at said sensing means,
    adjustable control means for selecting a value according to the desired concentration of carbon dioxide in said system,
    means for comparing said parameter produced by said sensing means with the value selected by said adjustable control means,
    and valve means operable by said comparing means for controlling a flow of carbon dioxide from said source to said gaseous environment so that said actual concentration reaches the desired concentration.

6. The apparatus according to claim 5 wherein said sensing means comprises an electrical conductor and means for passing a current through said electrical conductor, said parameter comprising the resistance thereof.

7. The apparatus according to claim 6 further including bridge means including said conductor, and where said means for comparing comprises comparison amplifier means to which said valve means is responsive, said comparison amplifier means comparing the output of said bridge means with said selected value.

8. The apparatus according to claim 6 including a bridge means wherein said bridge means includes a reference conductor for balancing said bridge means and wherein current is also passed through said reference conductor, said reference conductor being located proximate said sensing means and responsive to the ambient temperature of the environment, but being closed to the direct influence of gases in the circulation stream.

9. The apparatus according to claim 5 wherein said means for providing a circulation comprises a motor-operated fan having an impeller located in said gaseous environment.

10. The apparatus according to claim 9 including a plenum chamber which includes said fan in operable relation therewith, said plenum chamber further including said sensing means in operable relation therewith.

11. The apparatus according to claim 10 including means for introducing said carbon dioxide into said gaseous environment in the plenum chamber including means directing carbon dioxide into the circulation stream of the plenum chamber upstream from the sensing means.

12. The apparatus according to claim 5 further including humidity sensitive means also disposed in relation to said gaseous environment for producing a second parameter which changes in accordance with the humidity of said environment,
   second adjustable control means for selecting a desired humidity value,
   means for comparing said second parameter with said value by said second adjustable control means,
   and valve means operable by said comparing means for adding water to aid environment so that the humidity in said system is controlled to the desired value.

13. Apparatus according to claim 12 including further coupling means operative in response to the desired humidity value for calibrating the comparison of desired carbon dioxide concentration, in accordance with the controlled humidity.

14. Apparatus for controlling the concentration of a selected gas in a system providing a gaseous environment, wherein a source of said selected gas is provided therefor, said apparatus comprising:
   a plenum chamber and means disposed in relation to said plenum chamber and gaseous environment for providing a circulation of gas from said gaseous environment through said plenum chamber causing the gas in said plenum chamber to be an adequate sample of the gas in said environment,
   sensing means located in operative relation with said plenum chamber in the circulation stream produced therethrough and responsive to the circulation stream for providing a parameter which changes in accordance with the concentration of said selected gas at said sensing means, said selected gas having a specific heat which differs substantially from that of air, said sensing means being responsive to the divergence in specific heat of said selected gas from the rest of the gaseous environment,
   control means for selecting a value according to the desired concentration of selected gas in the system,
   means for comparing said parameter produced by said sensing means with the value selected by said control means
   means for introducing said selected gas into said gaseous environment in operative relation to the circulation stream through said plenum chamber,
   and valve means operable by said comparing means for controlling the flow of said selected gas from said source to said means for introducing the selected gas, so that the actual concentration thereof reaches the desired concentration.

15. The apparatus according to claim 14 wherein said means for introducing said selected gas is disposed in said circulation stream before said sensing means so that said sensing means will immediately detect the injection of selected gas by said means for introducing the same.

16. The apparatus according to calim 15 wherein said means for providing circulation comprises a fan, and wherein said sensing means is located downstream from said fan in said circulation stream.

17. The apparatus according to claim 14 further including a bridge circuit including said sensing means and also including a reference conductor, said reference conductor being located proximate said sensing means and responsive to the ambient temperature of the environment but being closed to the direct influence of gases in the environment.

18. The apparatus according to claim 14 wherein said plenum chamber further includes means for changing the temperature of gases flowing therethrough.

19. The apparatus according to claim 14 further including means located in operative relation to said plenum chamber responsive to the humidity of the circulation stream, and means for controlling said humidity in response to the last mentioned means including means for injecting moisture in relation to said circulation stream so that the humidity reaches a predetermined value.

20. The apparatus according to claim 14 wherein said selected gas comprises carbon dioxide.

21. The apparatus according to claim 14 wherein said sensing means comprises an electrical conductor and means for passing a current through said electrical conductor, said parameter comprising the resistance thereof.

22. Apparatus for controlling the concentration of carbon dioxide in a controlled environment enclosure, said apparatus comprising:
   sensing means located in communication with the gaseous environment of said enclosure for producing a parameter in accordance with a concentration of carbon dioxide at said sensing means,
   control means for selecting the desired concentration of carbon dioxide in the enclosure, and means for comparing said parameter with the selected concentration, a source of carbon dioxide and means for coupling said carbon dioxide to said gaseous environment, and valve means disposed in said coupling means for controlling a flow of carbon dioxide therethrough in accordance with said comparison to bring the actual concentration of carbon dioxide to the desired concentration.

23. The apparatus according to claim 22 further including fan means disposed in cummunication with the gaseous environment of said enclosure for providing a circulation therein, preventing gaseous layering.

24. The apparatus according to claim 23 wherein said fan means includes an impeller located within said enclosure, said sensing means being located adjacent said impeller.

25. The apparatus according to claim 23 including a plenum chamber in communication with said enclosure and including said fan means in operative relation therewith for producing a flow of gas from said enclosure and back into said enclosure, said plenum chamber having said sensing means operative relation therewith for producing said parameter relative to the flow of gas through said plenum chamber.

26. The apparatus according to claim 25 wherein said enclosure comprises an incubator and said plenum chamber is located substantially above the lower floor of said incubator, and including duct means communicating from said plenum chamber to the lower part of said incubator for delivering the flow of gas from said plenum chamber back into said incubator, and means for coupling the flow of gas from the upper part of said incubator into said plenum chamber.

27. The apparatus according to claim 26 wherein said duct means extends in coaxial relation through said means for coupling the flow of gas from the upper part of said incubator, the last mentioned means comprising an opening in the upper part of the incubator.

28. The apparatus according to claim 25 wherein said means for coupling carbon dioxide to said gaseous environment includes means for coupling carbon dioxide to said plenum chamber upstream in the flow of gas from said sensing means.

29. The apparatus according to claim 25 wherein said enclosure comprises an environmental room having said plenum chamber suspended from a top wall thereof and adapted to direct said flow of gas in a direction initially substantially parallel to said top wall, said plenum chamber having entrance and exit openings at front and rear parallel vertical walls thereof respectively, said fan means being positioned in said rear vertical wall.

30. The apparatus according to claim 25 wherein said enclosure comprises an incubator and wherein said plenum chamber is located proximate the top interior of said incubator, said plenum chamber having a lower opening, and said fan means having an impeller disposed over said opening for directing a flow of gas longitudinally through said plenum chamber, said plenum chamber being provided with an exit port at at least one end thereof from which the flow of gas leaves said plenum chamber.

31. The apparatus according to claim 30 wherein said sensing means is disposed between said impeller and said exit port within said plenum chamber.

* * * * *

UNITED STATES PATENT OFFICE
CERTIFICATE OF CORRECTION

PATENT NO. : 3,848,569
DATED : November 19, 1974
INVENTOR(S) : Max H. Folsom

It is certified that error appears in the above-identified patent and that said Letters Patent are hereby corrected as shown below:

Column 9, line 18, after "as" insert --a--.

Column 10, line 16, "mew" should be --new--.

Column 13, line 47, claim 12, line 11, "aid" should be --said--.

Column 14, line 30, claim 16, line 1, "calim" should be --claim--.

Column 15, line 23, claim 25, line 6, after "means" insert --in--.

Signed and sealed this 10th day of June 1975.

(SEAL)
Attest:

RUTH C. MASON
Attesting Officer

C. MARSHALL DANN
Commissioner of Patents
and Trademarks